(12) United States Patent
Lee et al.

(10) Patent No.: US 6,321,195 B1
(45) Date of Patent: Nov. 20, 2001

(54) SPEECH RECOGNITION METHOD (75) Inventors: Yun Keun Lee; Jong Seok Lee; Gi Bak Kim, all of Seoul; Byoung Soo Lee, Kyungki-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/295,523

(22) Filed: Apr. 21, 1999

(30) Foreign Application Priority Data

Apr. 28, 1998 (KR) ................................................ 10-15108
Apr. 28, 1998 (KR) ................................................ 10-15109
Apr. 30, 1998 (KR) ................................................ 10-15696

(51) Int. Cl.[7] .................................................. G10L 19/02
(52) U.S. Cl. .......................................... 704/241; 704/205
(58) Field of Search .................................. 704/200, 231, 704/241, 243, 201, 203, 204, 205, 206, 207, 214, 208, 236

(56) References Cited

U.S. PATENT DOCUMENTS

| 4,797,929 | * | 1/1989 | Gerson et al. ......................... 381/43 |
| 4,839,844 | * | 6/1989 | Watari .................................... 364/727 |
| 4,870,686 | * | 9/1989 | Gerson et al. ......................... 381/43 |
| 5,007,081 | * | 4/1991 | Schuckal et al. ..................... 379/354 |
| 5,809,453 | * | 9/1998 | Hunt ...................................... 704/214 |

OTHER PUBLICATIONS

Neural Networks for Signal Processing IV. Proceeding of the 1994 IEEE Workshop. Matsuura et al., "Word Recognition using a neural network and a phonetic based DTW" Sep. 1994.*

* cited by examiner

*Primary Examiner*—Richemond Dorvil
(74) *Attorney, Agent, or Firm*—Fleshner & Kim, LLP (57) ABSTRACT

The present invention relates to an automated dialing method for mobile telephones. According to the method, a user enters a telephone number via the keypad of the mobile phone, followed by speaking a corresponding codeword into the handset. The voice signal is encoded using the CODEC and vocoder already on board the mobile phone. The speech is divided into frames and each frame analyzed to ascertain its primary spectral features. These features are stored in memory as associated with the numeric keypad sequence. In recognition mode, the user speaks the codeword into the handset, which is analyzed in a like fashion as in training mode. The primary spectral features are compared with those stored in memory. When a match is declared according to preset criteria, the telephone number is automatically dialed by the mobile phone. Time warping techniques may be applied in the analysis to reduce timing variations.

27 Claims, 6 Drawing Sheets

SPEECH RECOGNITION METHOD

BACKGROUND OF THE INVENTION

1. Field of the Invention

The present invention relates to a speech recognition method for performing an automatic dialing function using speech recognition.

2. Description of Related Art

A human being communicates his/her thoughts to others with speech.

The speech that is a means for communication between human beings is used as a means for communication between a human being and machinery.

In other words, a speech recognition technique is applied to the operation of daily used electric and electronic equipment.

Especially, applying of the speech recognition technique to a mobile telephone accomplishes various advantages in use.

SUMMARY OF THE INVENTION

Accordingly, the present invention is directed to a speech recognition method that substantially obviates one or more of the limitations and disadvantages of the related art.

An objective of the present invention is to provide a speech recognition method for allowing dialing with speech by applying an existing speech recognition algorithm to a mobile telephone having a built-in vocoder.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, in a telephone modulating an input speech and having a built-in vocoder for encoding a modulated speech signal, a speech recognition method comprises: a training step of, if a user enters a telephone number and a speech corresponding to the telephone number, performing the encoding at the vocoder, detecting only a speech section using information output as a result of the encoding, and extracting and storing a feature of the detected speech section; a recognition step of, if an input speech is received, performing encoding at the vocoder, detecting only a speech section using information output as a result of the encoding, extracting a feature of the detected speech section, comparing the extracted feature with features of registered words stored during the training step, and selecting a registered word having a feature most similar to that of the input speech; and a step of determining a result of the recognition to be right if a similarity of the registered word selected at the recognition step does not exceed a predetermined threshold and automatically dialing a telephone number corresponding to the recognized word.

The training step and the recognition step are characterized by detecting only the actually voiced speech section from the input signal, using codebook gain as energy information, the codebook gain being output as the result of the encoding by the vocoder.

The training step and the recognition step are characterized by extracting spectrum coefficients of the frames corresponding to the speech section as features, the coefficients being output as the result of the encoding if the speech section is detected.

The recognition step is characterized by comparing the extracted features with the features of the registered words stored during the training step to select the registered word having the feature most similar to that of the input speech if the features of the frames corresponding to the speech section.

The recognition step is characterized by extracting line spectrum pair (LSP) parameters that have been encoded at the vocoder and transforming the extracted LSP parameters into pseudo-cepstrums The recognition step is characterized by using dynamic time warping (DTW) in comparing spectrum coefficients extracted from the input speech with spectrum coefficients of each word registered during the training step.

The recognition step is characterized by performing a pre-selection step prior to the DTW for selection of the registered word having the feature most similar to that of the input speech.

The pre-selection step is characterized by performing the DTW using only a part of spectrum information extracted from each frame to select a predetermined number of registered words having relatively high similarities and subsequently performing the DTW with respect to the selected registered words to finally select a registered word having the highest similarity to the input speech.

The pre-selection step is characterized by selecting a predetermined number of registered words having relatively high similarities using a linear matching method and subsequently performing DTW with respect to the selected registered words to finally select a registered word having the highest similarity to the input speech.

The simplest one of speech recognition techniques is speaker-dependent isolated word recognition.

According to this technique, only a previously trained one person's speech can be recognized and only a speech voiced in unit of words (or short sentences) can be recognized.

There are various existing speech recognition algorithms. They can be largely classified into a speech section detecting process, a feature extracting process, and a matching process.

Such processes require a relatively large amount of calculation, so a high speed processor is needed. However, a mobile telephone on the market is equipped with a built-in vocoder where spectrum parameters of the speech are extracted, so the present invention is advantageous in that the special feature extracting process is not needed.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Other objectives, features, and advantages of the present invention shall become apparent from the following detailed description of the invention.

With reference to the accompanying drawings, the preferred embodiments of the present invention will now be described in detail.

Figure 1:
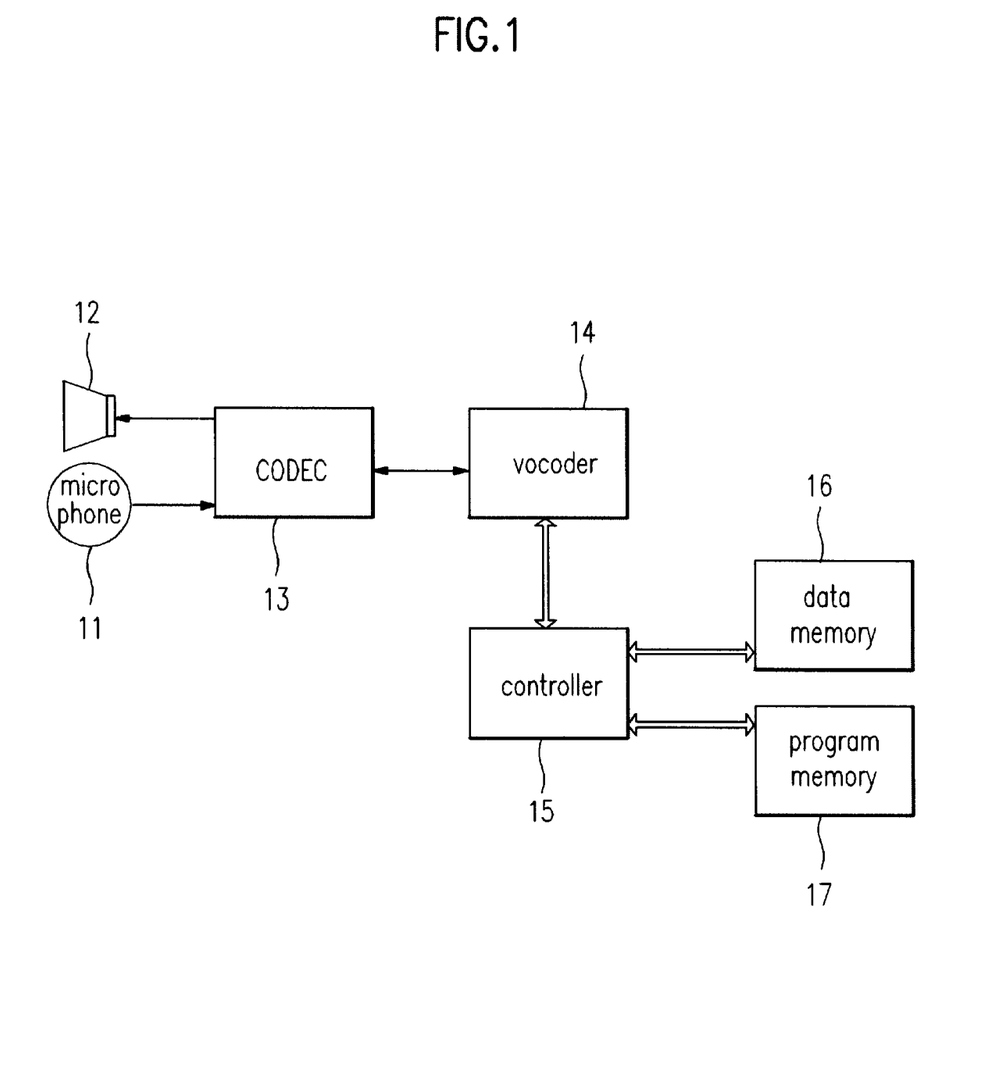
FIG. 1 is a block diagram showing a speech recognition telephone according to the present invention.

A speech recognition telephone system of the present invention shown in FIG. 1 comprises microphone (hereinafter, called a mic) 11, speaker 12, coder-decoder (CODEC) 13, vocoder 14, controller 15, data memory 16, and program memory 17.

In such configuration, the mic 11 converts a speech signal voiced and entered by a user into an electric signal and provides the electric signal to the CODEC 13. The speaker 12 outputs the speech from the CODEC 13 to the outside.

The CODEC 13 modulates the speech received via the mic 11 into pulse code modulation (PCM) or $\mu$-law PCM data and provides an output to the vocoder 14.

The CODEC 13 also demodulates an output speech signal from the vocoder 14 and provides an output to the speaker 12.

The vocoder 14 encodes the PCM or $\mu$-law PCM data.

At this time, the output data of the vocoder 14 is composed of a coefficient representing spectrum information and gain and information for modeling an excitation signal of the speech.

For example, there are an LSP coefficient, a codebook index and gain, and a delayed value and gain of a long-term predictor in case of QCELP.

The controller 15 for controlling overall operation of the speech recognition telephone controls training and recognition processes in accordance with speech recognition sequence stored in the program memory 17 for a speech recognition function and writes and reads necessary data while communicating data with the vocoder 14.

The data memory 16 stores data necessary for the operation of the telephone and reference patterns of registered words for the speech recognition.

The program memory 17 stores every sequence for the operation of the telephone.

A speech recognition algorithm is divided into the training process for making a database for reference patterns of the registered words and the recognition process for comparing incoming speech with the registered words to recognize the speech.

Figure 2:
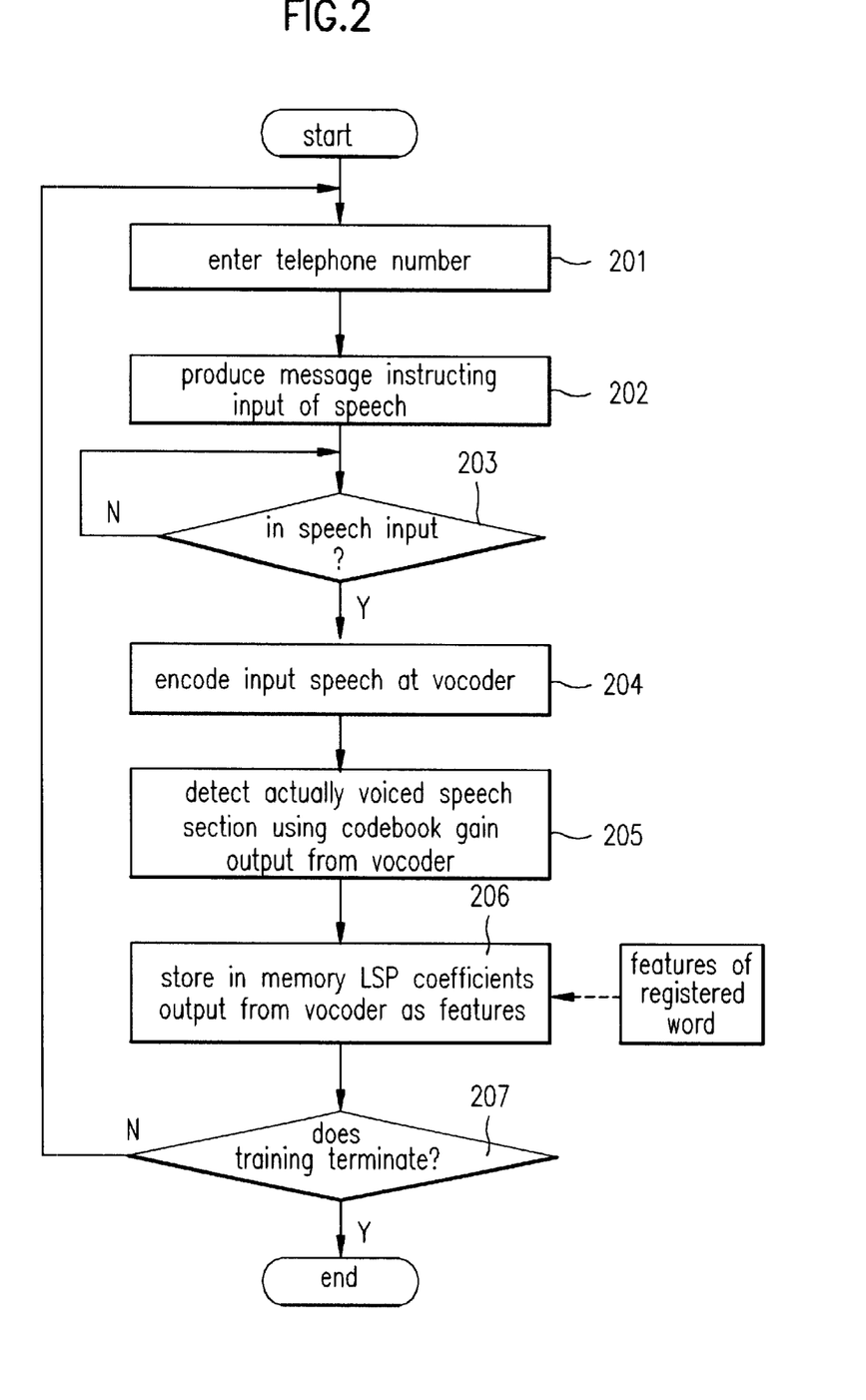
FIG. 2 is a flow chart showing a speech training process of a speech recognition algorithm according to the present invention.

Primarily, in the training process, as shown in FIG. 2, words to be recognized are registered.

In other words, once the user enters a telephone number and the speech corresponding to the telephone number, the input speech is analyzed to extract its feature and the feature is stored in the data memory 16.

At this time, the corresponding telephone number is assigned to the feature.

More specifically, once the user enters a desired telephone number using a ten-key (step 201), the telephone outputs via the speaker 12 a message instructing the user to input the speech (step 202).

Once the user then gives a speech corresponding to the entered telephone number (e.g., a speech corresponding to 911 is a "firehouse") to the mic 11 (step 203), the CODEC 13 modulates the input speech into the PCM or $\mu$-law PCM data and the vocoder 14 encodes the modulated speech received from the CODEC 13 (step 204).

The speech signal is divided into short section signals (namely, frames) so as to be encoded by the frame.

As a result of the encoding, spectrum information and excitation codebook gain is produced.

Only an actually voiced section, namely, a speech section is detected from the input signal based upon energy information of each frame (step 205).

The codebook gain output from the vocoder 14 is used as the energy information.

Specifically, the codebook gain indicates size information of the speech. If the gain exceeds a predetermined value, a corresponding signal is determined as the speech.

If the speech section is detected at the step 205, spectrum coefficients of the frames corresponding to the speech section are stored in the data memory 16 (step 206).

In other words, the spectrum information of speech signal frames is used as a speech feature. Features of all the frames are extracted to be stored or used for recognition.

The present invention uses the LSP coefficient output from the vocoder 14 as the feature.

All encoded data of frames falling under the speech section are stored in the data memory 16 to inform a result of the recognition with voice during the recognition process.

Afterward, if the user has more telephone numbers to enter, the progress turns back to the step 201 and then the above steps are repeated. If there is no telephone number to be entered, the progress ends (step 207).

Figure 3:
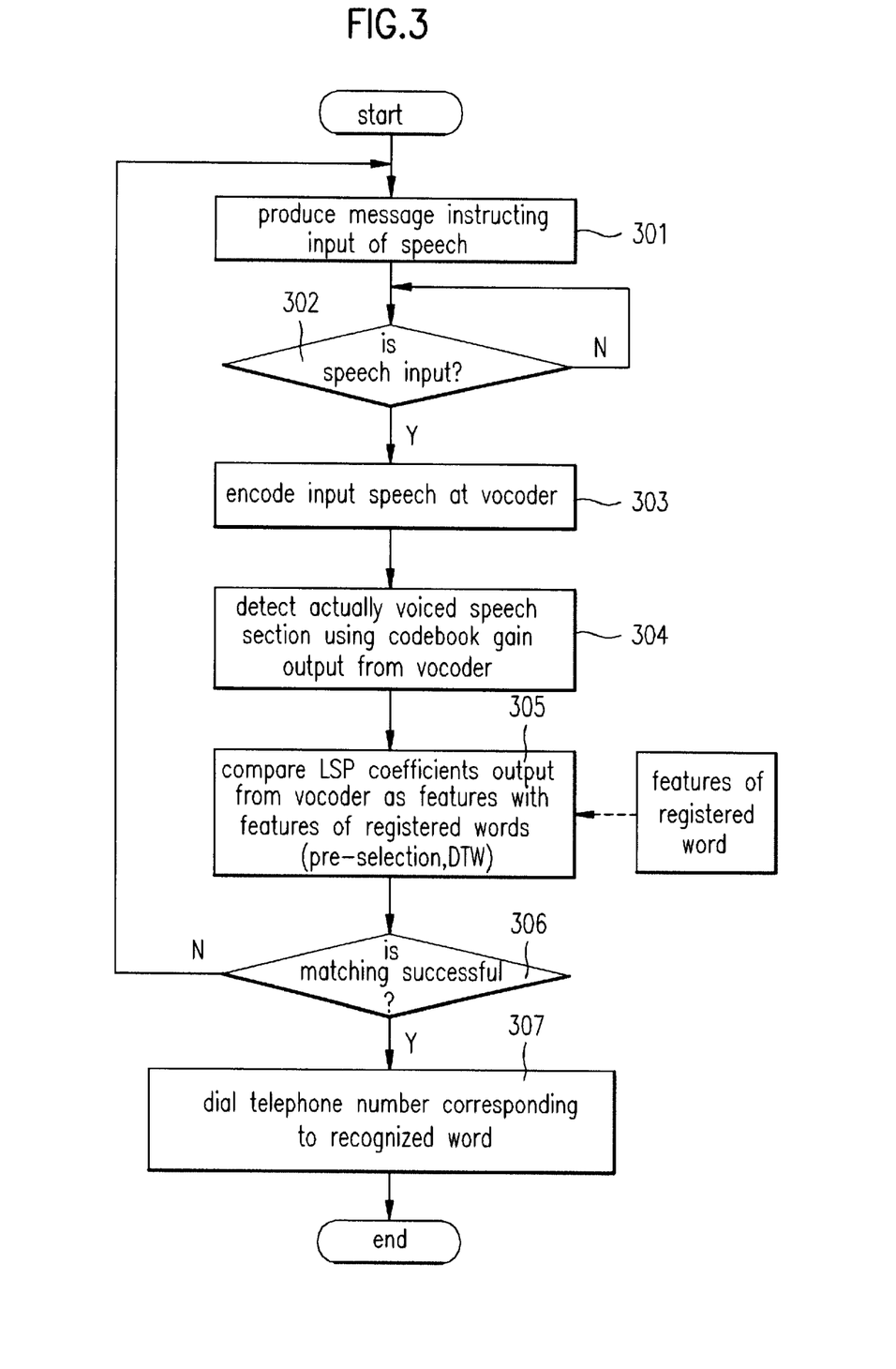
FIG. 3 is a flow chart showing a speech matching process of the speech recognition algorithm according to the present invention.

In the recognition process, as shown in FIG. 3, the speech recognition is accomplished in such a manner of comparing a word to be recognized with the registered words stored during the training process and fetching a most similar word.

Once the speech is recognized depending upon features of the registered words stored in the data memory 16, a telephone number corresponding to the feature of the recognized speech is automatically dialed in the recognition process.

Specifically, once a speech is input, the input speech is analyzed and its feature is extracted. The extracted feature is compared with the features of the registered words stored and a registered word having a feature most similar to the input speech is selected.

If the similarity satisfies a predetermined level, a result of the recognition is determined right, so the telephone number corresponding to the recognized word is automatically dialed. On the other hand, if the similarity does not satisfy the predetermined level, it can be assumed that an unregistered word is spoken, so the progress returns to the start of the recognition process.

More specifically, the telephone outputs the message instructing the user to give the speech via the speaker 12

(step 301) and the user, in turn, gives the mic 11 a previously registered word corresponding to a telephone number to be dialed (step 302).

For example, if the "firehouse" is registered for 911, the user should speak the "firehouse" to dial 911.

Similar to the training process as shown in FIG. 2, the CODEC 13 then modulates the input speech into the PCM or µ-law PCM data and the vocoder 14 encodes the modulated input speech received from the CODEC 13 (step 303).

The speech signal is divided into short section signals (namely, frames) so as to be encoded by the frame. As a result of the encoding, spectrum information and excitation codebook gain is produced.

Only an actually voiced section, namely, a speech section is detected from the input signal based upon energy information of each frame, and the codebook gain output from the vocoder 14 is used as the energy information (step 304).

Namely, the steps 301 to 304 are the same as corresponding steps in the training process shown in FIG. 2.

Once the speech section is detected at the step 304, a matching step of searching registered speech for a speech most similar to the input speech is performed (step 305).

Namely, features of the stored registered words are compared with a feature of the input speech to select a feature of a registered word most similar to the input speech feature. The selection feature is a result of the recognition.

For this result, spectrum coefficients extracted from the input speech are compared with spectrum coefficients of each word registered during the training process to calculate similarities.

After calculating similarities with respect to all the registered words, a registered word of the highest similarity is extracted.

During the calculation of similarities, a spoken speed of the input speech may be different from a spoken speed of the stored speech, so time-warping is applied to the speech to reduce errors caused by the spoken speed of the speech. Dynamic time warping (DTW) is used for the time-warping.

It is possible that the same user speaks the same word at different speed every time, so the speech signal may be nonlinearly elastic in a temporal domain due to differences of the spoken speed.

The DTW is a time regulating calculation method for comparing a test pattern (namely, the input speech) with a reference pattern (namely, the stored registered word) and determining a similarity between the two patterns, thereby eliminating a variation in the temporal domain.

Since time sections of the test pattern and reference pattern do not coincide, a time scale is determined in accordance with a non-linear time warping method.

The determination of the time scale is achieved using the DTW method. When using the DTW method, a path through which a similarity between the input pattern and reference pattern is maximum can be dynamically determined, so three processes of word boundary detection, nonlinear time alignment, and recognition are simultaneously performed.

Accordingly, there is no chance that a recognition error can occur due to errors occurring in word boundaries and the time alignment.

Figure 5:
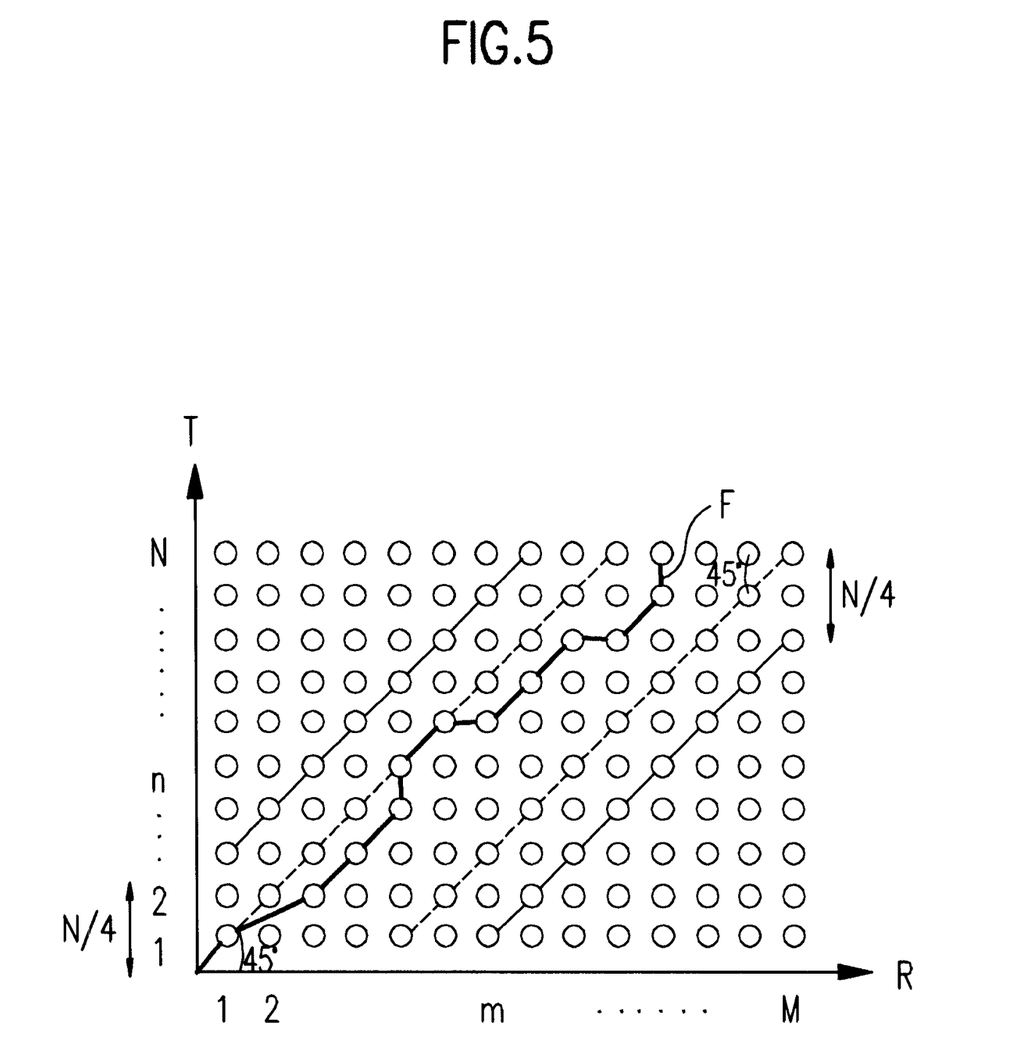
FIG. 5 is a coordinate plane showing a search section setting state according to the present invention.

For the DTW, primarily, lengths of two sequences to be matched are respectively expressed as N and M as shown in FIG. 5.

If the larger value of the two sequence lengths M and N to be compared exceeds double the smaller value of them, there is a bare possibility in that the two sequences agree, so the matching process is not performed and a matching distortion is set to a predetermined maximum value.

This operation is performed to exclude a registered word from the determination of the similarity of the recognized word to the input speech when a difference between lengths of the input word and registered word exceeds double the shorter one.

A two-dimensional quadrature coordinate plane having M×N trellis points is made for the matching of two sequences.

A length of a registered word, namely, the number of frames of the reference pattern, are compared with a length of the input speech, namely, the number of frames of the test pattern, and the pattern having the more frames is located onto an M axis for smooth calculation.

A window is established to reduce unnecessary calculation by limiting an optimal path search range.

Since there is no big difference if the same user speaks, the window can be established so as to limit the search range.

Establishing the window can be effected in various ways. In this invention, the window is determined as follows to easily establish the window without calculation of slopes and to increase calculation speed thus increasing a response speed.

Speech patterns R and T are sequences of feature vectors with respect to feature extraction and can be expressed as follows:

$$R=[R_1, R_2, \ldots, R_m, \ldots, R_M]$$

$$T=[T_1, T_2, \ldots, T_n, \ldots, T_N].$$

Figure 6:
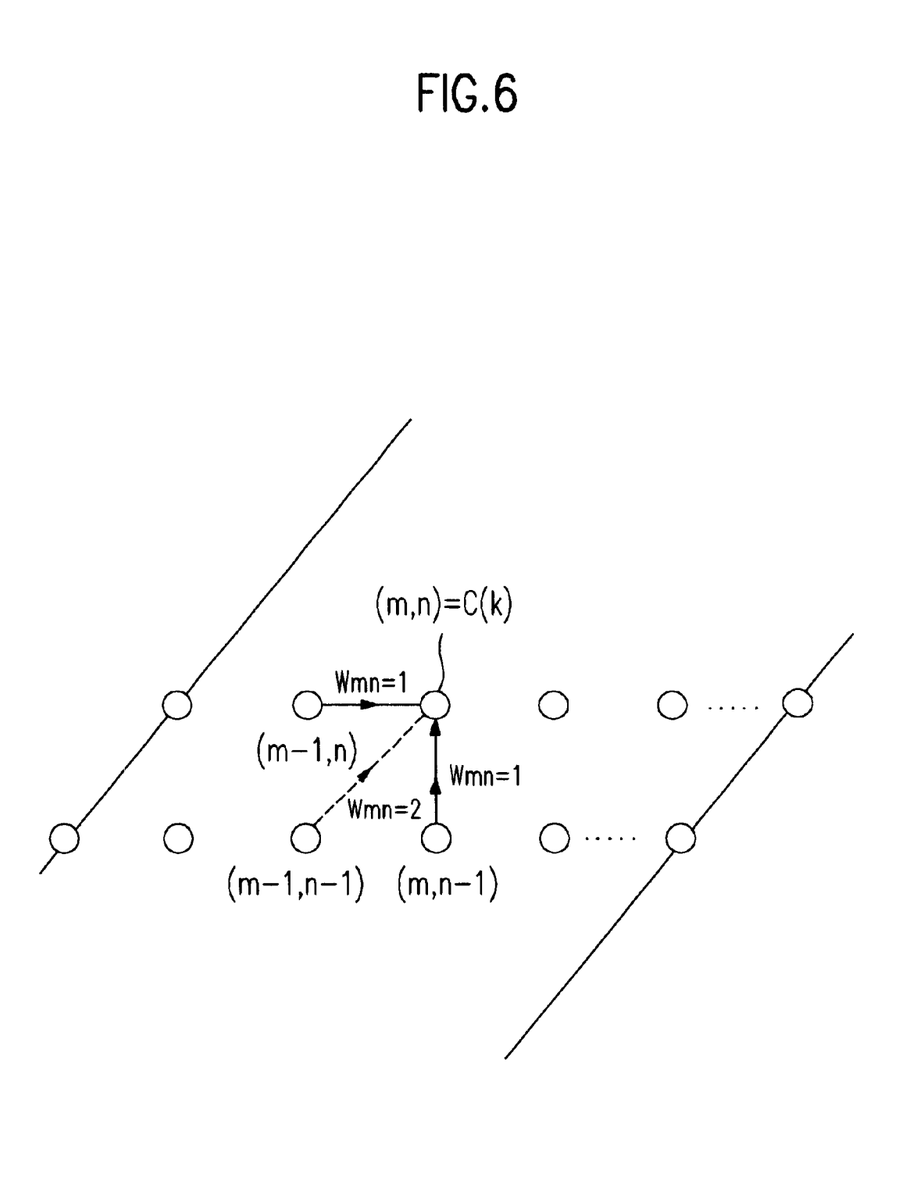
FIG. 6 shows a DTW coordinate plane according to the present invention.

The patterns R and T are respectively change depending upon an m axis and an n axis. A difference between the feature vectors of the speech patterns, as shown in FIG. 6, belongs to a C(k) series and is expressed as follows:

$$F=C(1), C(2), \ldots, C(k), \ldots, C(K),$$

wherein C(k)=(m(k), n(k)) and F is a warping function that projects a temporal domain from the test pattern to a temporal domain of the reference pattern.

The warping function is used to find an optimal path m=W(n) that is a minimum distance.

Then, the window limiting the optimal path search range is established to reduce unnecessary calculation.

Because there is no big difference in the speech when the same person speaks, the window can be established so as to limit the optimal path search section.

Primarily, slant lines having a slope 1 are respectively drawn starting from a start trellis point (1, 1) and an end trellis point (M, N).

If horizontally shifting the two slant lines as much as a predetermined value ($N/2^n$, wherein N is the number of frames, n is a natural number, and the most proper value is produced when n is 2), trellis points between the two slant lines falls under a section to be searched for the matching.

Setting a width of the window to $N/2^n$ eliminates a complex divider for a division, so just a shifter is used thus efficient.

Here, N can be the number of frames of the test pattern or the number of frames of the reference pattern.

A trellis point (m, n) within a search window has a minimum cumulative distance value of the mth feature and nth feature of the two sequences.

The feature value is scaled to have an integer of 0–5000.

A small section path is limited to avoid over-compression and over-expansion at a particular time section. A method of determining the small section path is shown in FIG. 6 as one embodiment.

In FIG. 6, one of three likely directions (m−1, n−1), (m−1, n), and (m, n−1) shifts to a particular trellis point (m, n) via a warping function.

For example, there are three likely ways reaching the trellis point (m, n): 1) direct shift from the trellis point (m−1, n−1) to the trellis point (m, n); 2) indirect shift from the trellis point (m−1, n) to the trellis point (m, n); and 3) indirect shift from a trellis point (m, n−1) to the trellis point (m, n).

Initial state: $D_{1,1} = 2d_{1,1}$ [Formula 1]

$$D_{m,n} = \min \begin{pmatrix} D_{m-1,n-1} + 2d_{m,m} \\ D_{m-1,n} + d_{m,m} \\ D_{m,n-1} + d_{m,m} \end{pmatrix}, 1 \le m \le M$$

$D_{m,n}$: minimum cumulative distance at the trellis point (m, n)

$d_{m,n}$: distance between two features at the trellis point $(m, n)$ $$= \sum_{i=1}^{p} |a_{1,m}^{i} - a_{2,n}^{i}|$$

$a_{l,m}^{i}$: i order value of the mth feature of the first sequence
$a_{l,m}^{i}$: i order value of the nth feature of the second sequence
P: order of a feature At this time, the reached trellis point (m, n) is related to a weight $W_{mn}$ of the Euclidean distance or cepstrum distance between the mth frame of the pattern R and the nth frame of the pattern T.

The weight $W_{mn}$ is applied to the respective indirect path and a weight $2W_{mn}$ is applied to the direct path, so the distance between two features at the trellis point (m, n) is defined as $d_{m,n}$ shown in the formula 1.

Differences between values corresponding to different orders of the two features are all summed up to obtain the distance between the two features.

The minimum cumulative distance at the trellis point (m, n) is calculated in accordance with the formula 1. If the calculated value goes beyond the range of an integer, it is substituted with a maximum integer value.

Minimum cumulative distance values of respective trellis points within the search section are sequentially calculated upward starting from a bottom row.

Minimum cumulative distance values of an immediate previous row are stored, because they are required for calculating minimum cumulative distance values of a present row.

A final matching score is obtained such that a minimum cumulative distance at a trellis point (M, N) is divided by the sum (M+N) of two sequence lengths.

Such DTW process is performed as many times as the number of registered words to calculate all similarities with respect to the registered words. After completion of the calculation, the most similar registered word is extracted.

If the similarity between the extracted most similar registered word and the input speech satisfies a predetermined level, for example, it does not exceed a predetermined threshold, a result of the recognition is determined to be right.

If the matching process is successfully completed (step 306), a telephone corresponding to the registered word is automatically dialed (step 307).

Alternatively, if the similarity between the extracted most similar registered word and the input speech exceeds the predetermined threshold, it is determined that an unregistered speech is input and the progress goes back to the step 301 to receive a new speech.

This step can be removed or added when necessary.

Figure 4:
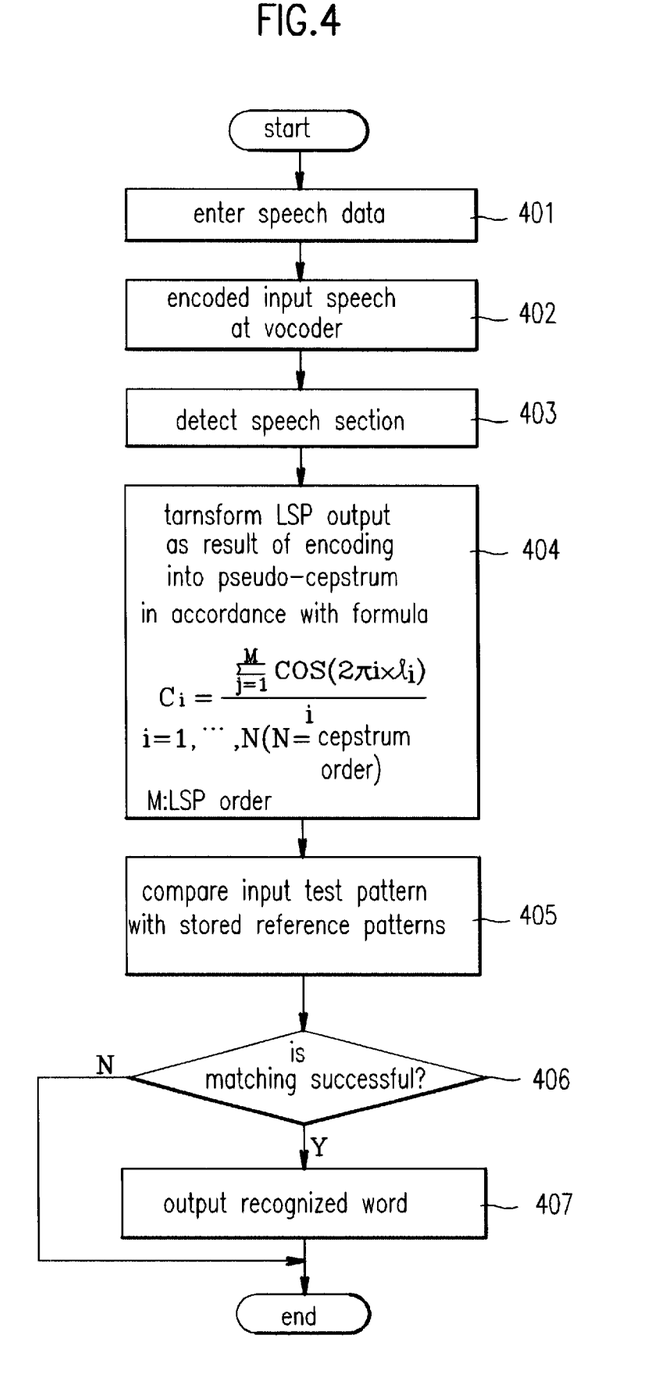
FIG. 4 is a flow chart showing a speech recognition process of the speech recognition algorithm according to the present invention.

As shown in FIG. 4, once the speech is input via the mic 11 (step 401), the speech is modulated into PCM or μ-law PCM and then encoded at the vocoder 14 (step 402).

The encoded speech signal is divided into short section signals (frames), and energy and a zero crossing rate of each frame is measured to detect only an actually voiced speech section (step 403).

For example, codebook gain produced as a result of the encoding can be used as energy information.

If the speech section is detected at the step 403, features of frames corresponding to the speech section are extracted. In this invention, the vocoder 14 is used, so LSP coefficients output from the vocoder 14 are used as features.

The vocoder 14 provides spectrum parameters of the speech, for example, the LSP coefficients, as the result of the encoding, so the present invention is advantageous in that a special process for extracting features is not required.

$$C_i = \frac{\sum_{j=1}^{M} \cos(2\pi i \times l_i)}{i}$$ [Formula 2]

$i = 1, \ldots, N$ (N: cepstrum order)

M: LSP order.

Since the LSP coefficient has the problem described before, the LSP coefficient is converted into a pseudo-cepstrum in accordance with the formula 2 (step 404).

The cepstrum of a certain signal is to inverse Fourier transform (IFT) the logarithm of a spectrum of the signal as shown in the following formula 3. The cepstrum coefficient is derived as a result.

$$\log S(w) = \sum_{n=-\infty}^{\infty} C_n e^{-jnw}$$ [Formula 3]

wherein S(w) is a power spectrum and $C_n$ is a cepstrum coefficient.

The term "cepstrum" is made such that alphabets of a leading part of the word "spectrum" are re-arranged in reverse order.

Since the cepstrum is the inverse transform of a function of a frequency domain, the cepstrum can be defined as a function of a temporal domain. One of the characteristics of the cepstrum is to separate spectrum envelope information and tract structure from the information of the speech.

According to the following formula 4, it will be appreciated that a cepstral distance is equal to an rms (root mean square) log spectral distance.

$$d_2^2 = \int_{-\pi}^{\pi} |\log S(w) - \log S'(w)$$ [Formula 4]

-continued $$= \sum_{n=-\infty}^{\infty} (C_n - C'_n)^2$$

Accordingly, a difference between power spectrums can be readily obtained when using the cepstrum, so the cepstrum is utilized a lot.

However, the cepstrum cannot be obtained from the LSP parameter, so the LSP parameter is transformed to the pseudo cepstrum similar to the cepstrum as shown in the formula 2.

The transformed pseudo-cepstrum is used as a feature vector of the test pattern or the reference pattern.

In other words, if the reference pattern of the speech signal is stored, the feature vector is stored in the data memory 16 as the reference pattern. In case of the speech matching process; the feature vector is used as the test pattern of the input speech, so the feature vector as the test pattern is compared with the reference pattern during the matching process (step 405).

When measuring a similarity between the test pattern and the reference pattern at the step 405, a voiced speed of the input speech can be different from a voiced speed of the stored speech, so time-warping is performed with respect to the speeches to reduce an error. A DTW method is used for the time-warping.

After performing the DTW as many times as the number of the registered reference patterns and calculating similarities with respect to all the registered reference patterns, the most similar reference pattern is extracted.

There are various DTW methods. This invention uses a method of measuring spectral distances between the test pattern and the respective reference patterns stored in the form of a database and selecting a reference pattern having the shortest spectral distance as a recognized pattern.

If the similarity of the reference pattern extracted at the step 405 satisfies a predetermined level, for example, it does not exceed a predetermined threshold, a result of the recognition is determined to be right (step 406) and the extracted reference pattern is output as the result of the recognition process (step 407).

On the other hand, the similarity between the extracted reference pattern and the test pattern exceeds the predetermined threshold, it is determined that an unregistered speech is input.

However, an amount of calculation is required for the DTW algorithm, so a response time is relatively long.

A pre-selection process is adopted to improve this problem. This process is performed before selecting the registered word most similar to the input speech. During this process, several registered words having relatively high similarities are obtained through simple calculation.

Registered word candidates are thus reduced so that the number of times of performing the DTW algorithm can be reduced. Consequently, the speed of response can be improved.

One of pre-selection methods is to determine N candidates by performing the DTW using only a part of spectrum information extracted from each frame and then perform the DTW with respect to the N candidates so as to determine a final candidate.

The part of the information is detected through a method of reducing orders of the spectrum coefficients, a method of sub-sampling the frames, or a method of using both methods together.

Another one of the pre-selection methods is to determine N candidates by using a linear matching method with less calculation than the DTW and perform the DTW with respect to the N candidates so as to determine a final candidate.

The former is adopted to be used in the embodiment of this invention. According to the former method, four of the 10 order LSP coefficients are used, so the number of codes generated for each frame is decreased. The frame is sub-sampled at the ratio of 2 to 1, so the optimal path search is performed skipping a frame.

As illustrated above, the speech recognition method of the present invention detects only the speech section using the codebook gain output from the vocoder in a mobile telephone terminal and applies the speech recognition function to the terminal with small additional calculation through use of a spectrum parameter as a feature, thereby allowing simple implementation of the speech recognition function in the mobile telephone terminal. The adoption of the speech recognition function can effect various advantages in use of the terminal.

In addition, the present invention uses the DTW in comparing an input speech with respective registered reference speeches and performs the pre-selection process prior to the DTW, thereby reducing a response time related to the speech response.

This invention can be applied to the PDA and the like effecting the same as illustrated in this embodiment.

It will be apparent to those skilled in the art that various modifications and variations can be made in the speech recognition method of the present invention without deviating from the spirit or scope of the invention. Thus, it is intended that the present invention covers the modifications and variations of this invention provided they come within the scope of the appended claims and their equivalents.

What is claimed is:

1. In a telephone modulating an input speech and having a built-in vocoder for encoding a modulated speech signal, a speech recognition method comprising:

a training step of, if a user enters a telephone number and a speech corresponding to said telephone number, performing the encoding at said vocoder, detecting only a speech section using information output as a result of the encoding, and extracting and storing a feature of the detected speech section;

a recognition step of, if an input speech is received, performing encoding at said vocoder, detecting only a speech section using information output as a result of the encoding, extracting a feature of the detected speech section, comparing the extracted feature with features of registered words stored during said training step, and selecting a registered word having a feature most similar to that of the input speech; and a step of determining a result of the recognition to be right if a similarity of the registered word selected at said recognition step does not exceed a predetermined threshold and automatically dialing a telephone number corresponding to the recognized word, wherein said recognition step comprises extracting LSP parameters that have been encoded at said vocoder and transforming the extracted LSP parameters into pseudo-cepstrums.

2. The speech recognition method according to claim 1, wherein said training step comprises:

a first step of, if the user enters the telephone number and the speech corresponding to said telephone number, modulating the input speech to provide an output to said vocoder, dividing the speech signal into frames, and performing the encoding by the frame;

a second step of detecting only the actually voiced speech section from the input signal, using codebook gain as energy information, said codebook gain being output as the result of the encoding at said first step;

a third step of, if the speech section is detected at said second step, storing spectrum coefficients of the frames corresponding to the speech section as features, said coefficients being output as the result of the encoding; and a fourth step of, if there is another telephone number to be entered, turning to said first step to repeat said steps.

3. The speech recognition method according to claim 2, wherein, in said third step, a line spectrum pair (LSP) coefficient output from said vocoder is used as the feature.

4. The speech recognition method according to claim 2, wherein said third step comprises the step of storing all encoded data of frames corresponding to the speech section for information of a result of the recognition with voice.

5. The speech recognition method according to claim 1, wherein said pseudo-cepstrum transforming step is defined as the following formula:

$$C_i = \frac{\sum_{j=1}^{M} \cos(2\pi i \times l_i)}{i}$$

$i = 1, \ldots, N$ ($N$: cepstrum order)

M: LSP order.

6. The speech recognition method according to claim 1, wherein said recognition step comprises:

a first step of, if the user enters a destination to be called with voice, modulating the input speech to provide an output to said vocoder, dividing the speech signal into frames, and performing the encoding by the frame;

a second step of detecting only the actually voiced speech section from the input signal, using codebook gain as energy information, said codebook gain being output as the result of the encoding at said first step; and a third step of, if the speech section is detected at said second step, extracting as features spectrum coefficients of frames corresponding to the speech section output as the result of the encoding, comparing the extracted features with the features of the registered words stored during said training step, and selecting the registered word having the feature most similar to that of the input speech.

7. The speech recognition method according to claim 6, wherein, in said third step, dynamic time warping (DTW) is used in comparing spectrum coefficients extracted from the input speech with spectrum coefficients of each word registered during said training step.

8. The speech recognition method according to claim 7, wherein said dynamic time warping comprises the steps of forming a two-dimensional quadrature coordinate plane having M×N trellis points (M is the number of frames of the input speech and N is the number of frames of a registered word) in order to matching two sequences of feature sets of the input speech and the stored registered word;

respectively drawing slant lines having a slope 1 starting from a start trellis point (1, 1) and an end trellis point (M, N) on said two dimensional quadrature coordinate plane and horizontally moving the two slant lines as much as a predetermined value (N2$^n$, wherein N is the number of frames and n is a natural number) to establish a search section for matching;

calculating a distance between two features at each trellis point in a row within said search section and selecting a path through which a minimum distance between the two features is implemented;

repeating said minimum path selection step with respect to all the rows within said search section; and dividing a minimum cumulative distance at said end trellis point (M, N) by a sum (M+N) of the two sequence to calculate a final matching score.

9. The speech recognition method according to claim 8, wherein said distance between the two features at each trellis point is calculated such that differences of values corresponding to respective orders of the two features are all summed up and defined as the following equations:

Initial state: $D_{1,1} = 2d_{1,1}$

Others: $D_{m,n} = \min\begin{pmatrix} D_{m-1,n-1} + 2d_{m,m} \\ D_{m-1,n} + d_{m,m} \\ D_{m,n-1} + d_{m,m} \end{pmatrix}, 1 \leq m \leq M, 1 \leq m \leq N$ $D_{m,n}$: minimum cumulative distance at the trellis point (m, n)

$d_{m,n}$: distance between two features at the trellis point (m, n)

$= \sum_{i=1}^{P} |a_{1,m}^i - a_{2,n}^i|$ $a_{l,m}^i$: i order value of the mth feature of the first sequence $a_{l,m}^i$: i order value of the nth feature of the second sequence P: order of a feature.

10. The speech recognition method according to claim 9, wherein a value of the minimum cumulative distance at each trellis point (m, n) is substituted with a maximum integer value if the minimum cumulative distance value goes beyond a range of the integer.

11. The speech recognition method according to claim 10, wherein said trellis point (m, n) in each row within said search section has the minimum cumulative distance value of mth and nth features of the two sequences of a test pattern and reference pattern.

12. The speech recognition method according to claim 11, wherein a new path value of said trellis point (m, n) in each row within said search section is repeatedly generated by way of at least one function of a distance value directly shifting from a previous trellis point (m−1, n−1) to the present trellis point (m, n) and distance values indirectly shifting from two neighboring trellis points (m−1, n) and (m, n−1) to the present trellis point (m, n).

13. The speech recognition method according to claim 12, wherein a minimum cumulative distance value in a very previous row is stored to obtain a minimum cumulative distance value in the present row.

14. The speech recognition method according to claim 1, wherein the recognition step further comprises applying a different pre-selection process to reduce a number of candidates codewords in the recognition step.

15. The speech recognition method according to claim 14, wherein said pre-selection step comprises the step of performing dynamic time warping (DTW) using only a part of spectrum information extracted from each frame to select a predetermined number of registered words having relatively high similarities and subsequently performing the DTW with respect to the selected registered words to finally select a registered word having the highest similarity to the input speech.

16. The speech recognition method according to claim 15, wherein said pre-selection step comprises the step of decreasing orders of the spectrum coefficient extracted from each frame and performing the DTW to select the predetermined number of registered words having relatively high similarities.

17. The speech recognition method according to claim 15, wherein said pre-selection step comprises the step of sub-sampling the frames to reduce the number of frames and performing the DTW to select the predetermined number of registered words having relatively high similarities.

18. The speech recognition method according to claim 15, wherein said pre-selection step comprises the step of decreasing orders of the spectrum coefficient extracted from each frame, sub-sampling the frames, and performing the DTW to select the predetermined number of registered words having relatively high similarities.

19. The speech recognition method according to claim 14, wherein said pre-selection step comprises the step of selecting a predetermined number of registered words having relatively high similarities using a linear matching method and subsequently performing dynamic time warping with respect to the selected registered words to finally select a registered word having the highest similarity to the input speech.

20. In a telephone modulating an input speech and having a built-in vocoder for encoding a modulated speech signal, a speech recognition method comprising:

a training step of, if a user enters a telephone number and a speech corresponding to said telephone number, performing the encoding at said vocoder, detecting only a speech section using information output as a result of the encoding, and extracting and storing a feature of the detected speech section;

a recognition step of, if an input speech is received, performing encoding at said vocoder, detecting only a speech section using information output as a result of the encoding, extracting a feature of the detected speech section, comparing the extracted feature with features of registered words stored during said training step, and selecting a registered word having a feature most similar to that of the input speech; and a step of determining a result of the recognition to be right if a similarity of the registered word selected at said recognition step does not exceed a predetermined threshold and automatically dialing a telephone number corresponding to the recognized word, wherein said recognition step comprises extracting stored representations of audio signals encoded by the vocoder and transforming said stored representation of audio signals into pseudo-cepstrums.

21. The speech recognition method according to claim 20, wherein said stored representations of audio signals are primary coefficients of a spectrum analysis performed by the vocoder.

22. The speech recognition method according to claim 20, wherein said stored representations of audio signals are LSP parameters that have been encoded at said vocoder and transforming the extracted LSP parameters into pseudo-cepstrums.

23. The speech recognition method according to claim 20, wherein said recognition step comprises:

a first step of, if the user enters a destination to be called with voice, modulating the input speech to provide an output to said vocoder, dividing the speech signal into frames, and performing the encoding by the frame;

a second step of detecting only the actually voiced speech section from the input signal, using codebook gain as energy information, said codebook gain being output as the result of the encoding at said first step; and a third step of, if the speech section is detected at said second step, extracting as features spectrum coefficients of frames corresponding to the speech section output as the result of the encoding, comparing the extracted features with the features of the registered words stored during said training step, and selecting the registered word having the feature most similar to that of the input speech, wherein said third step comprises a different pre-selection step to reduce a number of registered words for the comparison prior to selection of the registered word having the feature most similar to that of the input speech.

24. In a telephone modulating an input speech and having a built-in vocoder for encoding a modulated speech signal, a speech recognition method comprising:

a training step of, if a user enters a telephone number and a speech corresponding to said telephone number, performing the encoding at said vocoder, detecting only a speech section using information output as a result of the encoding, and extracting and storing a feature of the detected speech section;

a recognition step of, if an input speech is received, performing encoding at said vocoder, detecting only a speech section using information output as a result of the encoding, extracting a feature of the detected speech section, comparing the extracted feature with features of registered words stored during said training step, and selecting a registered word having a feature most similar to that of the input speech; and a step of determining a result of the recognition to be right if a similarity of the registered word selected at said recognition step does not exceed a predetermined threshold and automatically dialing a telephone number corresponding to the recognized word, wherein the recognition step further comprises applying a different comparing and selecting criteria in a separate pre-selection process prior to selection of the registered word having the feature most similar to that of the input speech.

25. The speech recognition method of claim 24, wherein the preselection process further comprises performing DTW using only part of the spectrum information.

26. The speech recognition method of claim 24, wherein the preselection process further comprises using a linear matching method prior to the application of the DTW.

27. The speech recognition method of claim 24, wherein the preselection process further comprises eliminating a number of high order cepstrum coefficients.

* * * * *